United States Patent
Yoon et al.

(10) Patent No.: US 12,555,839 B2
(45) Date of Patent: Feb. 17, 2026

(54) BATTERY MODULE, BATTERY PACK INCLUDING THE SAME, AND METHOD OF MANUFACTURING BATTERY MODULE

(71) Applicant: LG ENERGY SOLUTION, LTD., Seoul (KR)

(72) Inventors: Seok Eun Yoon, Daejeon (KR); Junghoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 611 days.

(21) Appl. No.: 17/918,848

(22) PCT Filed: Dec. 24, 2021

(86) PCT No.: PCT/KR2021/019807
§ 371 (c)(1),
(2) Date: Oct. 13, 2022

(87) PCT Pub. No.: WO2022/158734
PCT Pub. Date: Jul. 28, 2022

(65) Prior Publication Data
US 2023/0139477 A1    May 4, 2023

(30) Foreign Application Priority Data
Jan. 19, 2021 (KR) .......... 10-2021-0007655

(51) Int. Cl.
*H01M 10/613* (2014.01)
*H01M 10/647* (2014.01)
(Continued)

(52) U.S. Cl.
CPC ....... *H01M 10/613* (2015.04); *H01M 10/647* (2015.04); *H01M 10/653* (2015.04);
(Continued)

(58) Field of Classification Search
None
See application file for complete search history.

(56) References Cited

U.S. PATENT DOCUMENTS

2009/0197153 A1\* 8/2009 Fujikawa ............. H01M 50/30
429/82
2013/0004822 A1   1/2013 Hashimoto et al.
(Continued)

FOREIGN PATENT DOCUMENTS

CN   108346762 A   7/2018
CN   109428021 A   3/2019
(Continued)

OTHER PUBLICATIONS

KR-20200075688-A English machine translation (Year: 2020).\*

*Primary Examiner* — Scott J. Chmielecki
(74) *Attorney, Agent, or Firm* — Bryan Cave Leighton Paisner LLP (57) ABSTRACT

A battery module and a battery pack including the same. The battery module includes a battery cell stack including a plurality of battery cells, a housing for the battery cell stack, and a thermal conductive resin layer located between a lower surface of the housing and a first end of the battery cell stack. The first end of the battery cell stack has a double-folded seal part.

10 Claims, 11 Drawing Sheets

(51) Int. Cl.
  *H01M 10/653* (2014.01)
  *H01M 10/6554* (2014.01)
  *H01M 50/211* (2021.01)
  *H01M 50/30* (2021.01)
  *H01M 50/383* (2021.01)

(52) U.S. Cl.
  CPC ..... *H01M 10/6554* (2015.04); *H01M 50/211* (2021.01); *H01M 50/30* (2021.01); *H01M 50/383* (2021.01)

(56) References Cited

U.S. PATENT DOCUMENTS

| | | | |
|---|---|---|---|
| 2015/0263318 A1 | 9/2015 | Suzuki et al. | |
| 2016/0197386 A1 | 7/2016 | Moon et al. | |
| 2016/0233465 A1 | 8/2016 | Lee et al. | |
| 2017/0373289 A1 | 12/2017 | Lee et al. | |
| 2018/0019452 A1 | 1/2018 | Suzuki et al. | |
| 2018/0331336 A1 | 11/2018 | Choi et al. | |
| 2020/0006823 A1 | 1/2020 | Chung et al. | |
| 2020/0185797 A1 | 6/2020 | Park et al. | |
| 2020/0350644 A1 | 11/2020 | Cho et al. | |
| 2020/0388805 A1* | 12/2020 | Yoo | H01M 10/6567 |
| 2020/0388891 A1* | 12/2020 | Choi | H01M 50/233 |
| 2021/0057689 A1 | 2/2021 | Park et al. | |
| 2021/0359357 A1 | 11/2021 | Chung et al. | |
| 2022/0037710 A1 | 2/2022 | Yoon et al. | |
| 2023/0109938 A1 | 4/2023 | Shin et al. | |
| 2025/0219067 A1* | 7/2025 | Kim | H01M 4/463 |

FOREIGN PATENT DOCUMENTS

| | | | | |
|---|---|---|---|---|
| CN | 209133578 U | | 7/2019 | |
| CN | 111670516 A | | 9/2020 | |
| CN | 212209612 U | | 12/2020 | |
| EP | 3373384 A1 | | 9/2018 | |
| EP | 3 796 462 A1 | | 3/2021 | |
| JP | 2001250515 A | * | 9/2001 | |
| JP | 2008300692 | | 12/2008 | |
| JP | 2013012441 | | 1/2013 | |
| JP | 2017526102 | | 9/2017 | |
| JP | 2018507512 | | 3/2018 | |
| JP | 2018510463 | | 4/2018 | |
| JP | 2019508870 | | 3/2019 | |
| JP | 2019169454 | | 10/2019 | |
| KR | 10-2015-0106337 A | | 9/2015 | |
| KR | 10-2016-0016516 A | | 2/2016 | |
| KR | 10-1636378 B1 | | 7/2016 | |
| KR | 10-2018-0112630 A | | 10/2018 | |
| KR | 10-2018-0113802 A | | 10/2018 | |
| KR | 10-2019-0092835 A | | 8/2019 | |
| KR | 10-2019-0127135 A | | 11/2019 | |
| KR | 10-2020-0003600 A | | 1/2020 | |
| KR | 10-2072098 B1 | | 1/2020 | |
| KR | 10-2020-0012547 A | | 2/2020 | |
| KR | 20200075688 A | * | 6/2020 | ............ H01M 50/20 |
| KR | 10-2020-0099106 A | | 8/2020 | |
| KR | 10-2187056 B1 | | 12/2020 | |
| KR | 20210129489 A | * | 10/2021 | ............ H01M 50/24 |
| WO | 2020166998 | | 2/2020 | |

* cited by examiner

[FIG. 1]

[FIG. 2]
Damage to the terminal and battery cell of modules facing each other

BATTERY MODULE, BATTERY PACK INCLUDING THE SAME, AND METHOD OF MANUFACTURING BATTERY MODULE

CROSS-REFERENCE TO RELATED APPLICATIONS

This application is a US national phase of international Application No. PCT/KR2021/019807 filed on Dec. 24, 2021, and claims the benefit of Korean Patent Application No. 10-2021-0007655 filed on Jan. 19, 2021, the contents of which are incorporated herein by reference in their entirety.

TECHNICAL FIELD

The present disclosure relates to a battery module, a battery pack including the same, and a method of manufacturing the battery pack, and more particularly to a battery module with improved safety, a battery pack including the same, and a method of manufacturing the battery pack.

BACKGROUND

Along with the increase in technological development and demand for a mobile device, demand for a secondary battery as an energy source is increasing rapidly, and accordingly, research on a battery capable of meeting various demands is being increasingly performed.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Recently, along with a continuous rise of the necessity for a large-capacity secondary battery structure, including the utilization of the secondary battery as an energy storage source, there is a growing demand for a battery pack having a multi-module structure which is an assembly of battery modules in which a plurality of secondary batteries are connected in series or in parallel.

Meanwhile, when a plurality of battery cells are connected in series or in parallel to configure a battery pack, a common method of configuring a battery module starts with at least one battery cell and then other components are added to the at least one battery module to configure the battery pack. Since the battery cells constituting these medium- or large-sized battery modules are composed of chargeable/dischargeable secondary batteries, such a high-output and large-capacity secondary battery generates a large amount of heat during a charging and discharging process.

The battery module may include a battery cell stack in which a plurality of battery cells are stacked, a housing that houses the battery cell stack, and a pair of end plates that cover the front and rear surfaces of the battery cell stack.

Figure 1:
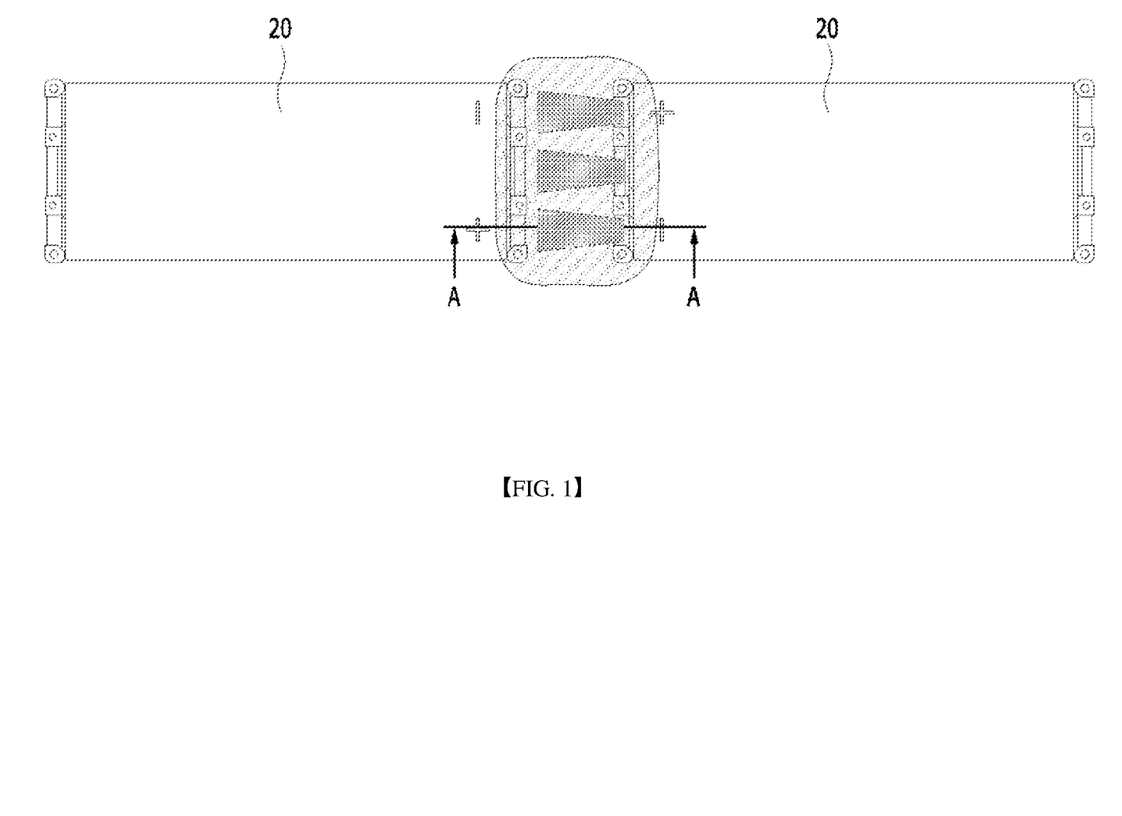
FIG. 1 is an illustration of a battery module mounted on a conventional battery pack at the time of ignition.
Figure 2:
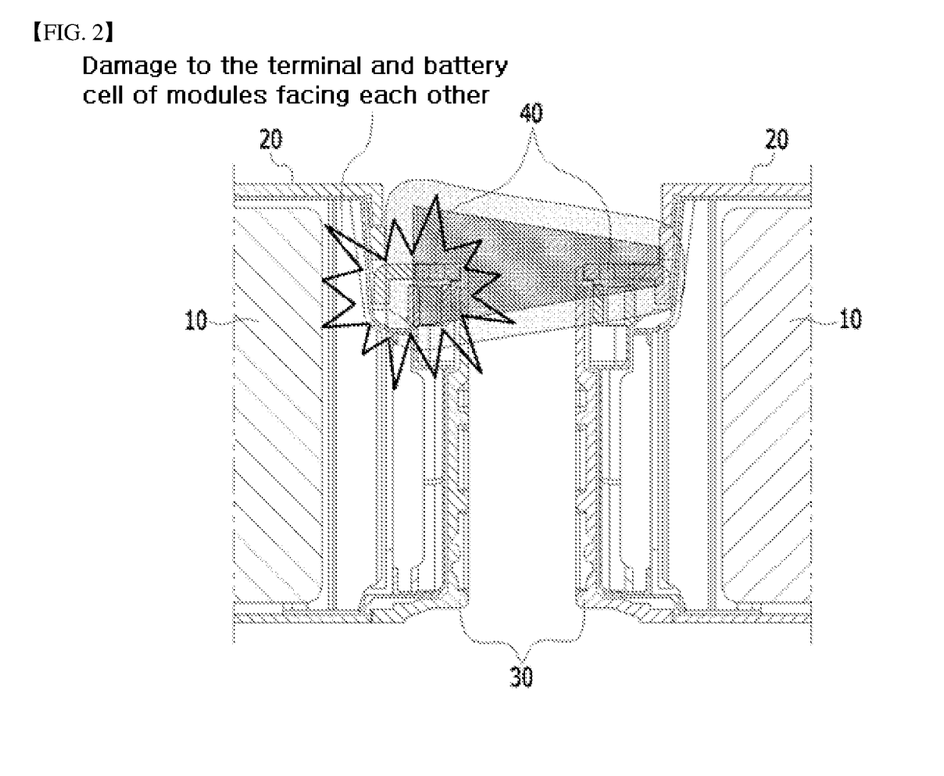
FIG. 2 is a cross-section view along line A-A of FIG. 1 showing the appearance of a flame that affects adjacent battery modules during ignition of a conventional battery module.

FIG. 1 illustrates a battery module mounted on the conventional battery pack at the time of ignition. FIG. 2 is a cross-section view along line A-A of FIG. 1 showing the appearance of a flame that affects adjacent battery modules during ignition of a conventional battery module.

As illustrated in FIGS. 1 and 2, the conventional battery module 10 includes a battery cell stack in which a plurality of battery cells 11 are stacked, a housing 20 that houses the battery cell stack, a pair of end plates 30 that are formed on the front and rear surfaces of the battery cell stack, a pair of terminal busbars 40 formed to protrude out of the end plate, and the like.

The housing 20 and the pair of end plates 30 can be coupled to be sealed through welding. When the housing 20 for housing the battery cell stack and the pair of end plates 30 are coupled in this way, the internal pressure of the battery cell 10 increases during overcharging of the battery module, whereby when the fusion strength limit value of the battery cell 10 is exceeded, the high-temperature heat, gas, and flame generated in the battery cell 10 may be discharged out of the battery cell 10.

The high-temperature heat, gas and flame can be discharged through the openings formed in each of the pair of end plates 30, but in a battery pack structure in which a plurality of battery modules are disposed such that the end plates 30 of adjacent battery modules face each other, battery modules adjacent to a battery module that ejects high-temperature heat, gas and flame can be affected. Thereby, the terminal busbar 40 formed on the end plate 30 of the adjacent battery module can be damaged, and the high-temperature heat, gas, and flame can enter the adjacent battery module via the openings formed in the end plate 30 of the adjacent battery modules and can damage the plurality of battery cells 10.

An attempt was made to separately form a hole through which the flame is discharged to reduce the occurrence of the above problems, and to form such a venting hole and thus increase the safety of the battery module, it is necessary to control the flame emission intensity.

SUMMARY

It is an object of the present disclosure to provide a battery module with improved safety, a battery pack including the same, and a method of manufacturing the battery pack.

However, the technical problem to be solved by embodiments of the present disclosure is not limited to the above-described problems, and can be variously expanded within the scope of the technical idea included in the present disclosure.

According to one aspect of the present disclosure, there is provided a battery module comprising: a battery cell stack in which a plurality of battery cells are stacked, a housing that houses the battery cell stack, and a thermal conductive resin layer that is located between a lower surface of the housing and a first end of the battery cell stack, wherein the first end of the battery cell stack has a double-folded seal part.

At least one injection hole for injecting a thermal conductive resin may be formed on the lower surface of the housing. The plurality of injection holes may be formed at the center of the lower surface of the housing and at both ends along the longitudinal direction.

The battery module may further include a venting hole formed on an upper surface of the housing adjacent to a second end that is located on the opposite side of the first end of the battery cell stack.

The battery module may further include a flame extinguishing mesh that covers the venting hole.

According to another aspect of the present disclosure, there is provided a method of manufacturing a battery module, the method comprising the steps of: stacking a plurality of battery cells to form a battery cell stack, housing the battery cell stack in a housing, inverting a lower surface of the housing so that the lower surface faces upwards, and injecting a thermal conductive resin through an injection hole formed in the lower surface of the housing, wherein the thermal conductive resin covers a first end of the battery cell stack having a double-folded seal part.

The method of manufacturing a battery module may further include, after the step of injecting the thermal conductive material, a step of inverting the lower surface of the housing so that the lower surface faces downwards.

The method of manufacturing a battery module may further include, before the step of housing the battery cells stack in the housing, a step of inverting the battery cell stack so that the first end of the battery cell stack is disposed on the lower surface of the housing.

The method of manufacturing a battery module may further include a step of forming a venting hole in the upper surface of the housing, and a step of forming a flame extinguishing mesh that covers the venting hole.

According to another aspect of the present disclosure, there is provided a battery pack comprising: the above-mentioned battery module, and a cooling plate located below the lower surface of the housing.

According to exemplary embodiments of the present disclosure, the thermal conductive resin can be applied to the junction part of the battery cell, thereby improving the robustness of the battery module.

Further, a flame extinguishing mesh can be mounted at the upper end of the housing located on the opposite side of the junction of the battery cell, thereby weakening the flame emission intensity and improving the flame extinguishing mesh.

The effects of the present disclosure are not limited to the effects mentioned above and additional other effects not described above will be clearly understood from the description of the appended claims by those skilled in the art.

DETAILED DESCRIPTION

Hereinafter, various embodiments of the present disclosure will be described in detail with reference to the accompanying drawings so that those skilled in the art can easily carry out the embodiments. The present disclosure can be modified in various different ways, and is not limited to the embodiments set forth herein.

Portions that are irrelevant to the description will be omitted to clearly describe the present disclosure, and like reference numerals designate like elements throughout the specification.

In the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are exaggerated.

It will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Throughout the specification, when a portion is referred to as "including" a certain component, it means that the portion can further include other components, without excluding the other components, unless otherwise stated.

Throughout the specification, when a portion is referred to as "planar", it means the target portion is viewed from the upper side, and when a portion is referred to as "cross-sectional", it means the target portion is viewed from the side of a cross section cut vertically.

Figure 3:
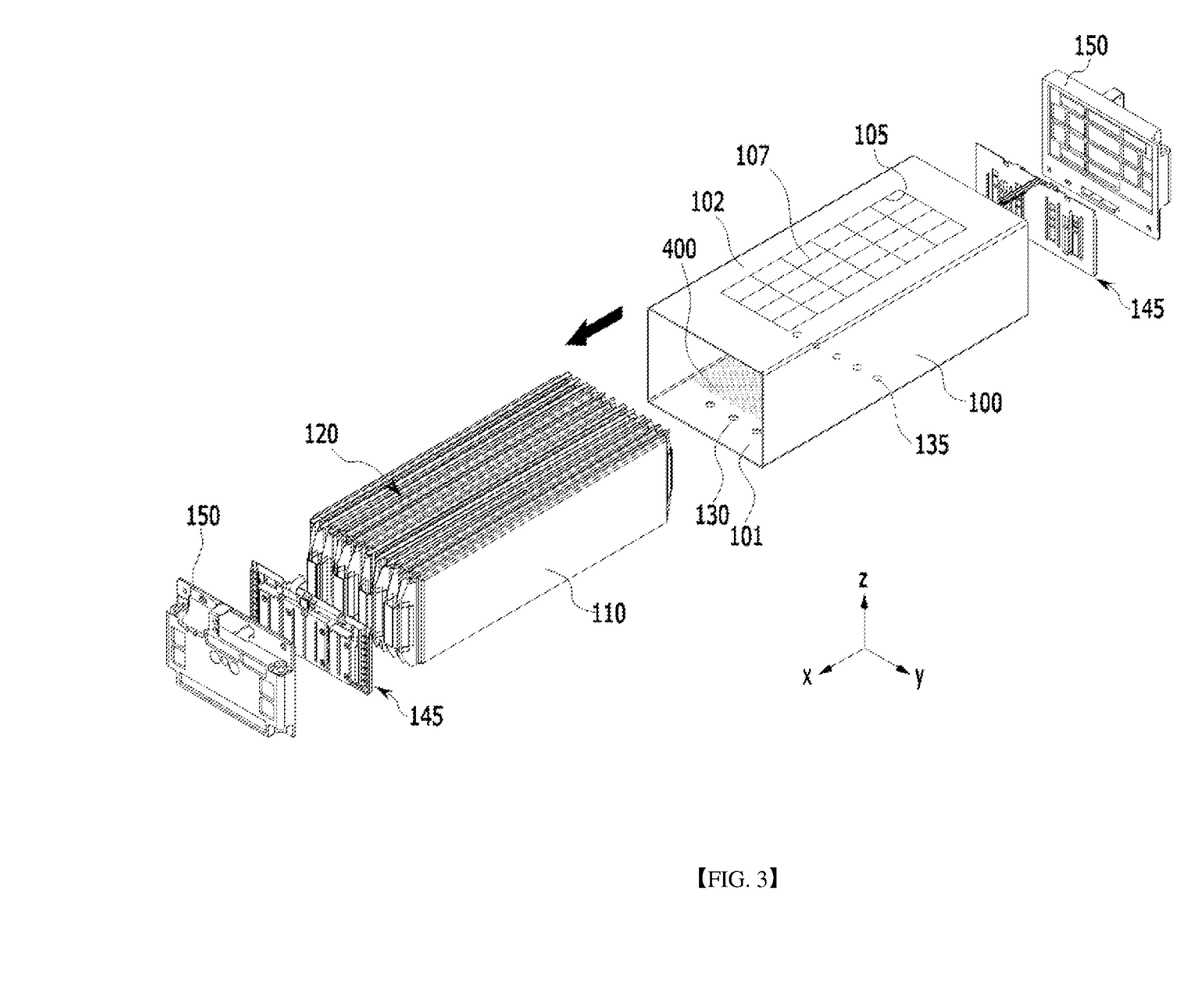
FIG. 3 is an exploded perspective view of a battery module according to an embodiment of the present disclosure.
Figure 4:
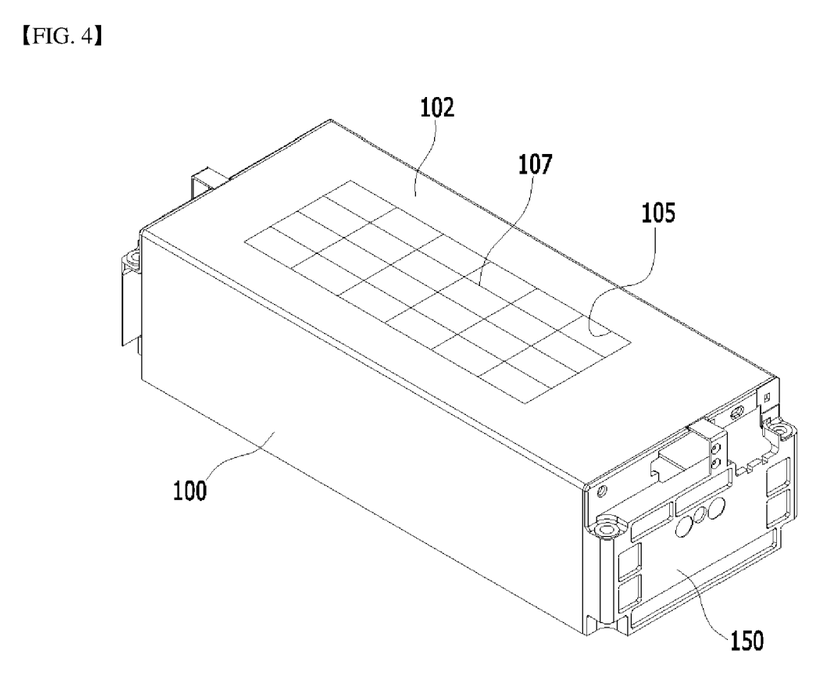
FIG. 4 is an illustration of the battery module components of FIG. 3 after they are combined.
Figure 5:
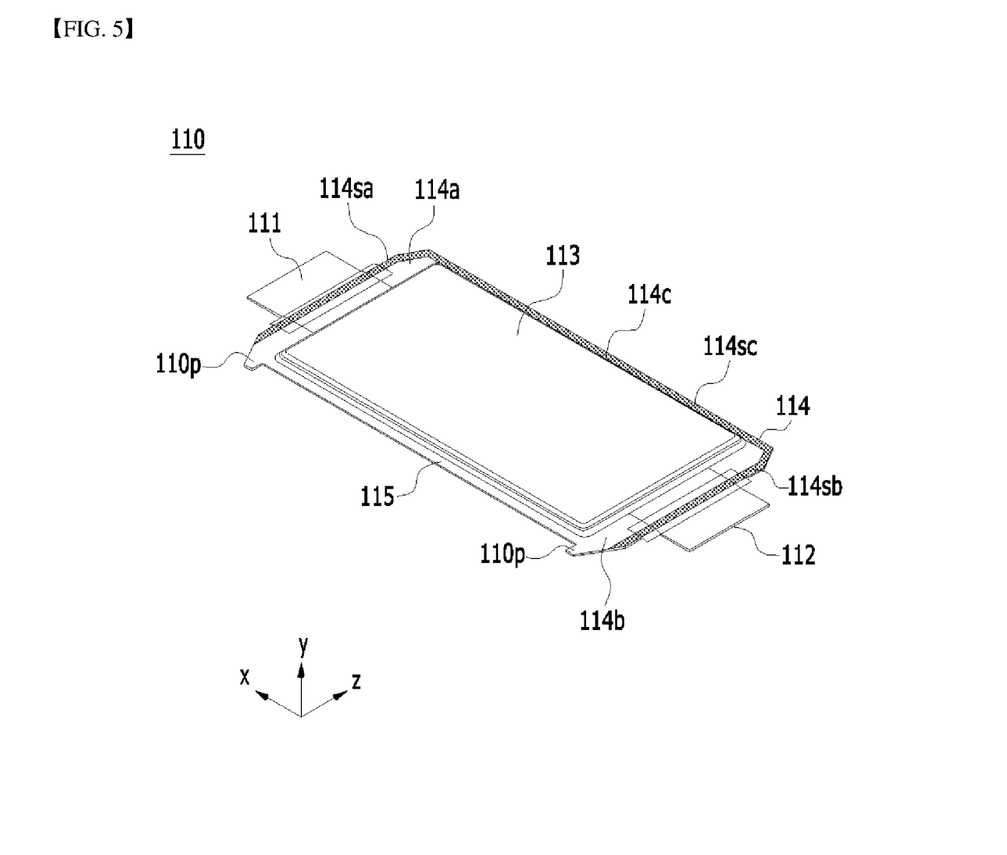
FIG. 5 is a perspective view of one battery cell included in the battery cell stack of FIG. 3.
Figure 6:
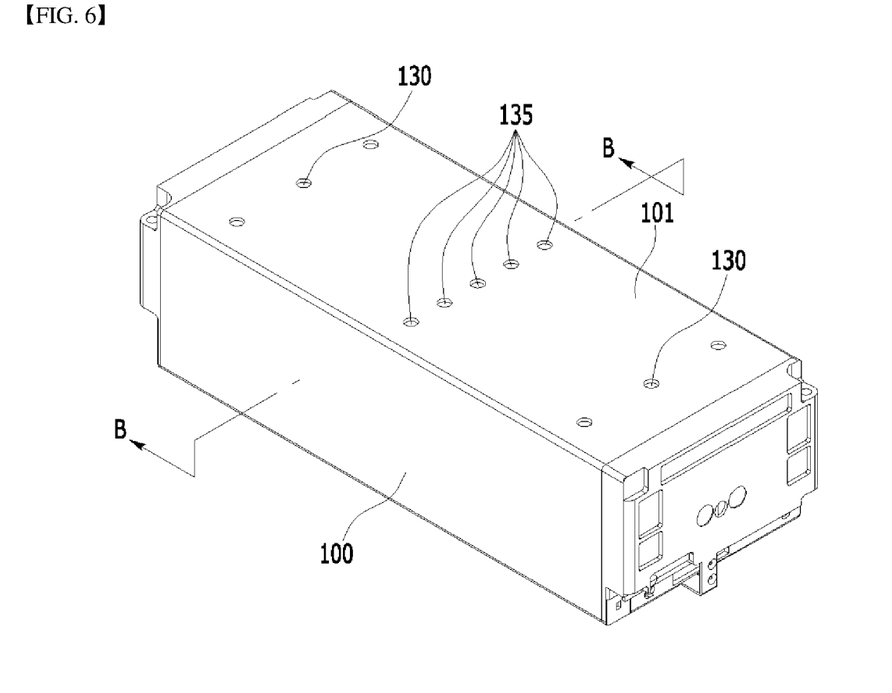
FIG. 6 is a perspective view of the battery module of FIG. 4 when the battery module is inverted to face downwards.
Figure 7:
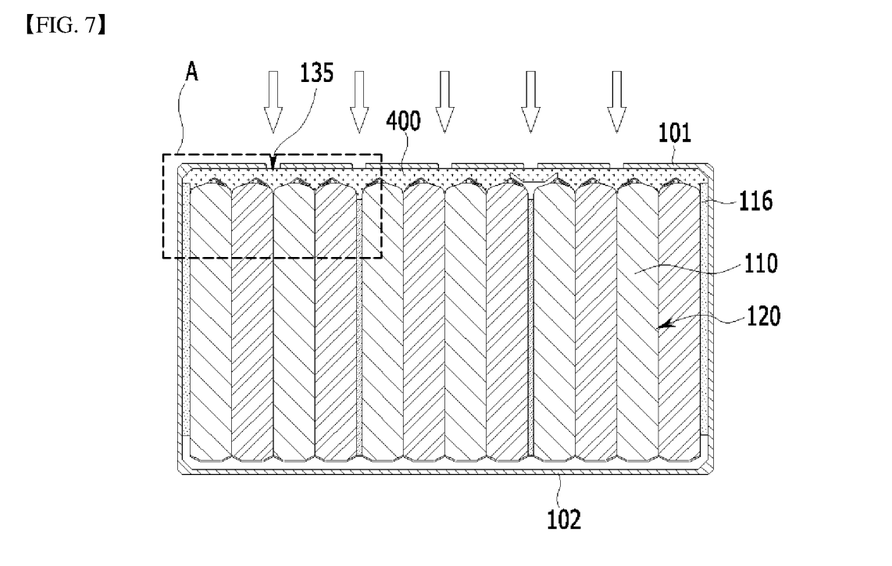
FIG. 7 is a cross-sectional view taken along line B-B of FIG. 6.
Figure 8:
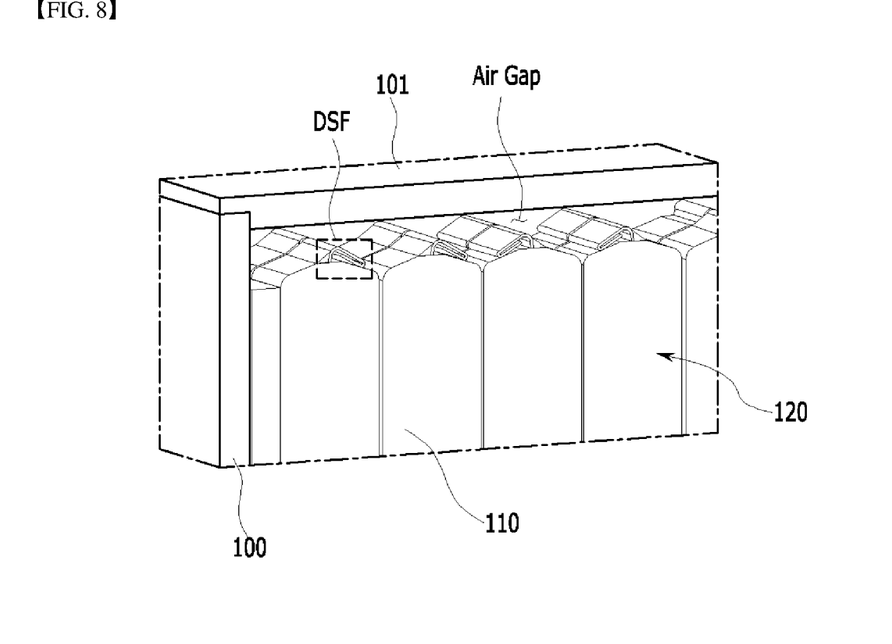
FIG. 8 is an enlarged perspective view of a section A of FIG. 7.

FIG. 3 is an exploded perspective view of a battery module according to an embodiment of the present disclosure. FIG. 4 is an illustration of the battery module components of FIG. 3 after they are combined. FIG. 5 is a perspective view of one battery cell included in the battery cell stack of FIG. 3. FIG. 6 is a perspective view of the battery module of FIG. 4, when the battery module is inverted to face downwards. FIG. 7 is a cross-sectional view along the line B-B of FIG. 6. FIG. 8 is an enlarged perspective view of a section A of FIG. 7.

As illustrated in FIGS. 3 and 4, a battery module according to the present embodiment includes a battery cell stack 120 in which a plurality of battery cells 110 are stacked, and a housing 100 that houses the battery cell stack 120 and has a lower surface 101 and an upper surface 102 corresponding to each other, wherein an injection hole 135 and/or a checking hole 130 for injecting a thermal conductive resin are formed in the lower surface 101 of the housing 100. A plurality of injection holes 135 can be formed at the center of the lower surface 101 of the housing 100 and at both ends in the longitudinal direction. Here, the longitudinal direction may be the same direction as the direction in which the battery cell stack 120 is inserted into the housing 100.

The housing 100 according to the present embodiment surrounds the remaining outer surfaces except for the front and rear surfaces of the battery cell stack 120, a pair of end plates 150 are located on the front and rear surfaces of the battery cell stack 120, respectively, and a busbar frame 145 is located between the battery cell stack 120 and each of the end plates 150. The remaining outer surfaces except for the front and rear surfaces of the battery cell stack 120 may be the upper, lower, left and right surfaces of the battery cell stack. The upper surface 102 and the lower surface 101 of the housing 100 may face each other in a direction perpendicular to the stacking direction of the battery cell stack 120. The stacking direction of the battery cell stack 120 may be the y-axis direction of FIG. 3, and the direction perpendicular thereto may be the z-axis direction.

As illustrated in FIGS. 3 and 6, a thermal conductive resin layer 400 is located between the lower surface 101 of the housing 100 and the battery cell stack 120 according to the present embodiment. The thermal conductive resin layer 400 may be formed by curing the thermal conductive resin injected through the injection holes 135, and may serve to transfer heat generated in the battery cell stack 120 to the outside of the battery module, and fix the battery cell stack 120 in the battery module.

As illustrated in FIG. 7, the battery module according to the present embodiment may further include a compression pad 116 located between the outermost battery cell 110 of the battery cell stack 120 and the corresponding side surface part of the housing 100. The compression pad 116 may be formed using a polyurethane-based material. The compression pad 116 can absorb the thickness deformation due to swelling of the battery cell 110 and the change in the battery cell 110 due to an external impact. At least one compression pad 116 may be formed not only between the outermost battery cell 110 and the corresponding side surface part of the housing 100, but also between adjacent battery cells 110.

The battery cell stack 120 includes a plurality of battery cells 110 stacked in one direction, and the plurality of battery cells 110 may be stacked in the y-axis direction as illustrated in FIG. 3. The battery cell 110 is preferably a pouch-type battery cell. For example, as illustrated in FIG. 5, the battery cell 110 according to the present embodiment has a structure in which the two electrode leads 111 and 112 protrude from one end 114a and the other end 114b, respectively, of the battery body part 113 in mutually opposite directions. The battery cell 110 can be manufactured by joining both ends 114a and 114b of a cell case 114 and both side parts 114c connecting them when an electrode assembly (not shown) is housed in a cell case 114. The battery cells 110 according to the present embodiment have a total of three seal parts 114sa, 114sb and 114sc, the seal parts 114sa, 114sb and 114sc have a structure that is sealed by a method such as heat-sealing, and the remaining other one side part can be composed of a connection part 115. Between both end parts 114a and 114b of the battery case 114 can be defined as the longitudinal direction of the battery cell 110, and between one side part 114c connecting both end parts 114a and 114b of the battery case 114 and the connection part 115 can be defined as the width direction of the battery cell 110.

The connection part 115 is a region extending along one edge of the battery cell 110, and a protrusion 110p of the battery cell 110 can be formed at an end of the connection part 115. The protrusion 110p may be formed on at least one of both ends of the connection part 115 and may protrude in a direction perpendicular to the extension direction of the connection part 115. The protrusion 110p may be located between one of the seal parts 114sa and 114sb of both ends 114a and 114b of the battery case 114 and the connection part 115.

The battery case 114 generally has a laminated structure of a resin layer/a metal thin film layer/a resin layer. For example, when the surface of the battery case is formed of an O (oriented)-nylon layer, it tends to slide easily due to external impact when stacking a plurality of battery cells to form a medium- or large-sized battery module. Therefore, an adhesive member such as a cohesive-type adhesive such as a double-sided tape or a chemical adhesive bonded by chemical reaction during adhesion can be attached to the surface of the battery case to form a battery cell stack 100 to prevent these problems and maintain a stable stacked structure of the battery cells 110. According to the present embodiment, the battery cells 110 can be stacked along the y-axis direction, and housed inside the housing 180 in the z-axis direction so that cooling can be performed by a thermal conductive resin layer described later. As a comparative example, the battery cells are formed of cartridge-shaped parts, and the fixing between the battery cells is made by assembling the battery housing. In such a comparative example, there is almost no cooling action, or the cooling can proceed in the plane direction of the battery cell, due to the presence of the parts in the form of a cartridge and the cooling is not well performed in the height direction of the battery module.

As also illustrated in FIG. 3, the battery module according to the present embodiment may further include a venting hole 105 formed in the upper surface 102 of the housing adjacent to the second end that is located on the opposite side of the first end of the battery cell stack 120. A flame extinguishing mesh 107 covers the venting hole 105, so that the strength of the flame generated inside the battery module being discharged to the outside can be reduced.

As illustrated in FIG. 8, an air gap may exist between the lower surface 101 of the housing and the battery cell stack 120. The air gap can degrade the heat conducting characteristics, and the cooling efficiency may be decreased by the heat of the upper end of the battery cell 110, particularly the portion of the battery cell 110 adjacent to the double-folded seal part DSF. According to the present embodiment, the thermal conductive resin layer 400 formed by injecting the thermal conductive resin through the injection hole 135 of FIG. 7 can cover the first end of the battery cell stack 120 having the double folded seal part DSF.

Figure 9:
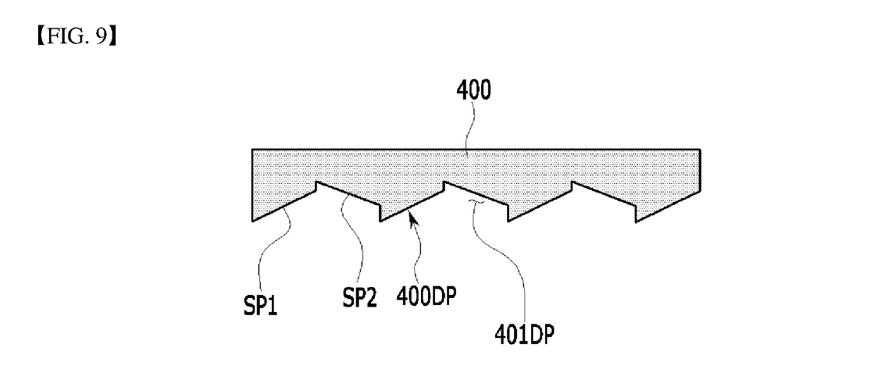
FIG. 9 is an illustration of a thermal conductive resin layer according to an embodiment of the present disclosure.
Figure 10:
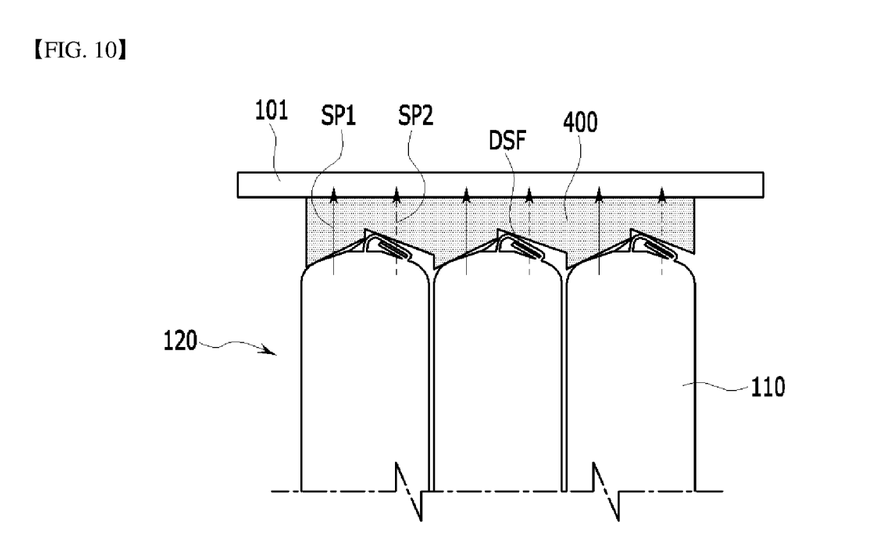
FIG. 10 is an illustration of battery module that includes the thermal conductive resin layer of FIG. 9.

FIG. 9 is an illustration of a thermal conductive resin layer according to the present embodiment. FIG. 10 is an illustration of the battery module including the thermal conductive resin layer of FIG. 9.

As illustrated in FIGS. 9 and 10, the thermal conductive resin layer 400 according to the present embodiment is located between the lower surface 101 of the housing and the battery cell stack 120. The thermal conductive resin layer 400 has a recessed pattern 400DP formed on a surface facing the battery cell stack 120. The recessed pattern 400DP may have a sawtooth shape. The recessed pattern 400DP has a structure corresponding to the first end of the battery cell 110, and the first end of the battery cell 110 may have a double side folded shape. The double-sided folded shape is that of the double-folded seal part DSF formed by folding the seal part of the cell case at least twice. Specifically, the first end part of the battery cell 110 may be a portion 114sc where both side surfaces 114c of the cell case 114 connecting both ends 114a and 114b of the cell case 114 are bonded as described with reference to FIG. 5. As illustrated in FIG. 5, the electrode leads 111 and 112 may be located at both ends of the battery cell 110 that is located in a direction perpendicular to the first end of the battery cell 110, and the battery cell 110 may have a rectangular structure in which the electrode leads 111 and 112 are formed long in a protruding direction.

As also illustrated in FIGS. 9 and 10, the recessed pattern 400DP of the thermal conductive resin layer 400 according to the present embodiment includes a plurality of recessed parts 401DP corresponding to the double folded seal part DSF of each of the plurality of battery cells 110.

The first end of the battery cell 110 has two different inclined surfaces, and the thermal conductive resin layer 400 also has a first inclined surface SP1 and a second inclined surface SP2 to correspond thereto. The first inclined surface SP1 of the thermal conductive resin layer 400 may come into contact with the first end of the battery cell 110, and the second inclined surface SP2 of the thermal conductive resin layer 400 may come into contact with the inclined surface of the double-folded seal part DSF. In order to form such a structure, the double-folded seal part DSF may come into close contact with the recessed part 401DP of the thermal conductive resin layer 400. By realizing such a structure, the contact area between the battery cell stack 120 and the thermal conductive resin layer 400 can be maximized and thus the cooling performance can be improved.

Due to the structure of the double folded seal part DSF, an air gap can be formed between the battery cell 110 and the double-folded seal part DSF. Consequently, the adhesive force of the portion where the second inclined surface SP2 of the heat conductive resin layer 400 and the inclined surface of the double folded seal part DSF come into contact with each other may be weaker than the adhesive force of the portion where the first inclined surface SP1 of the thermal conductive resin layer 400 comes into contact with the first end of the battery cell 110. Therefore, as illustrated in FIG. 9, the heat moving in the arrow direction passing through the second inclined surface SP2 may be relatively small compared to the heat moving in the arrow direction passing through the first inclined surface SP1. Specifically, the thermal efficiency of the die sealing gap existing therebetween may be complemented through the thermal conductive resin layer 400 because the double folded seal part (DSF) folds twice to tighten the seal part.

Next, a method of manufacturing a battery module according to another embodiment of the present disclosure will be described with reference to FIG. 11.

Figure 11:
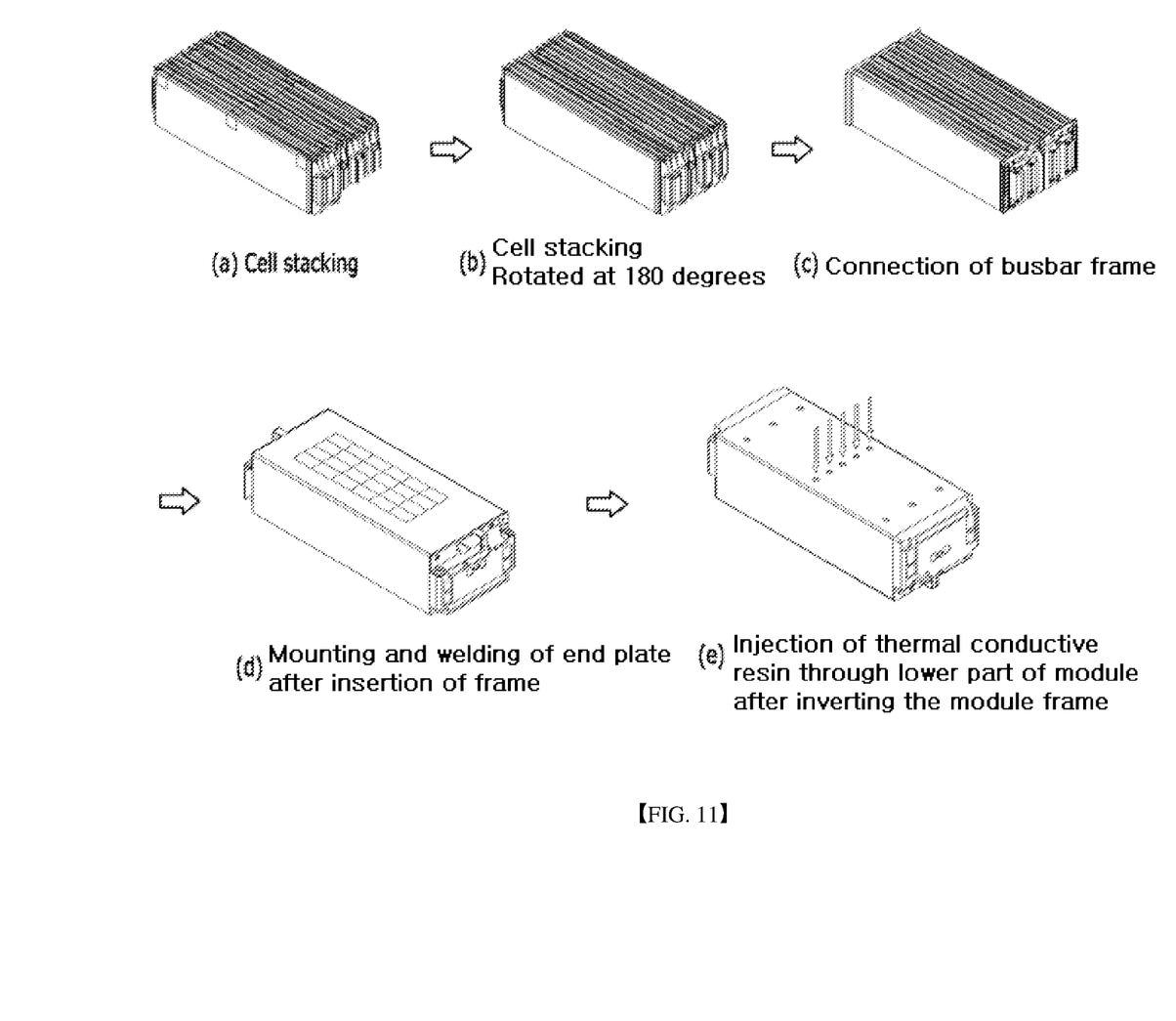
FIG. 11 illustrates a method of manufacturing a battery module according to another embodiment of the present disclosure.

As illustrated in FIG. 11, the method of manufacturing the battery module according to the present embodiment may include (a) a step of stacking a plurality of battery cells to form a battery cell stack, (b) a step of inverting the battery cell stack so that the first end of the battery cell stack is disposed on the lower surface of the housing, (c) a step of coupling busbar frames to the front and rear surfaces of the battery cell stack, (d) a step of housing the battery cell stack in the housing, and coupling each of a pair of end plates to the open front and rear ends, respectively, of the housing, (e) a step of inverting a lower surface of the housing so that it faces up, and (f) a step of injecting a thermal conductive resin through at least one injection hole formed in the lower surface of the housing.

In the step (a) of stacking a plurality of battery cells to form a battery cell stack, the battery cells 110 may be sequentially stacked along the y-axis direction as shown in FIG. 3.

In the step (b) of inverting the battery cell stack so that the first end of the battery cell stack is disposed on the lower surface of the housing, the first end having the double folded seal part may face downward.

In the step (e) of inverting a lower surface of the housing so that it faces up, the lower surface 101 of the housing in which the at least one injection hole 135 is formed may face upward to inject the thermal conductive resin through the injection hole 135, as shown in FIG. 7.

In the step (f) of injecting a thermal conductive resin through at least one injection hole formed in the lower surface of the housing, the thermal conductive resin may cover the first end of the battery cell stack having the double-folded seal part DSF as shown in FIG. 10.

The method of manufacturing the battery module according to the present embodiment may further include a step of forming a venting hole 105 in the upper surface 102 of the housing 100, and a step of forming a flame extinguishing mesh 107 to cover the venting hole 105 as shown in FIG. 4.

Figure 12:
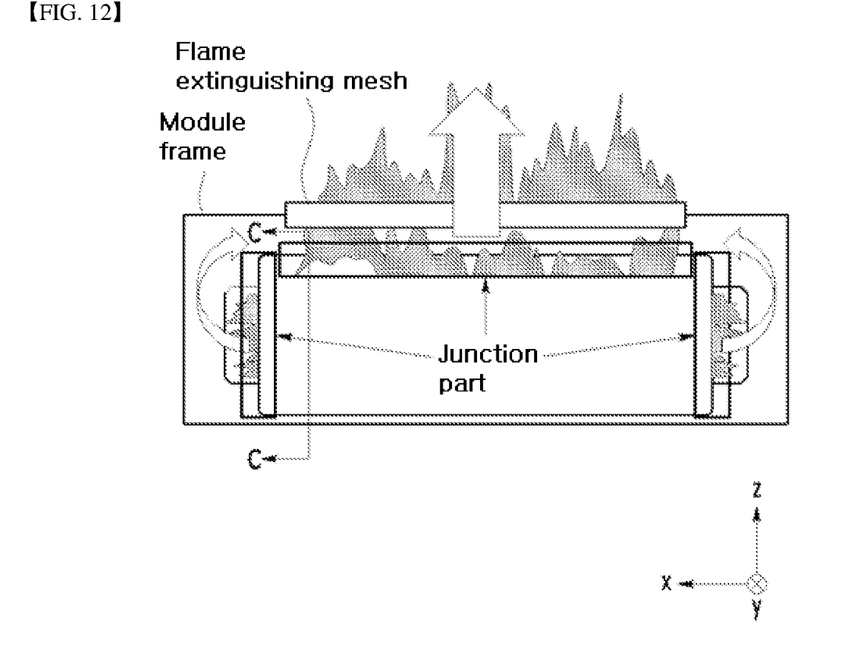
FIG. 12 is an illustration of a battery module according to a comparative example showing the ejection of gas and flame at the time of flame generation.
Figure 13:
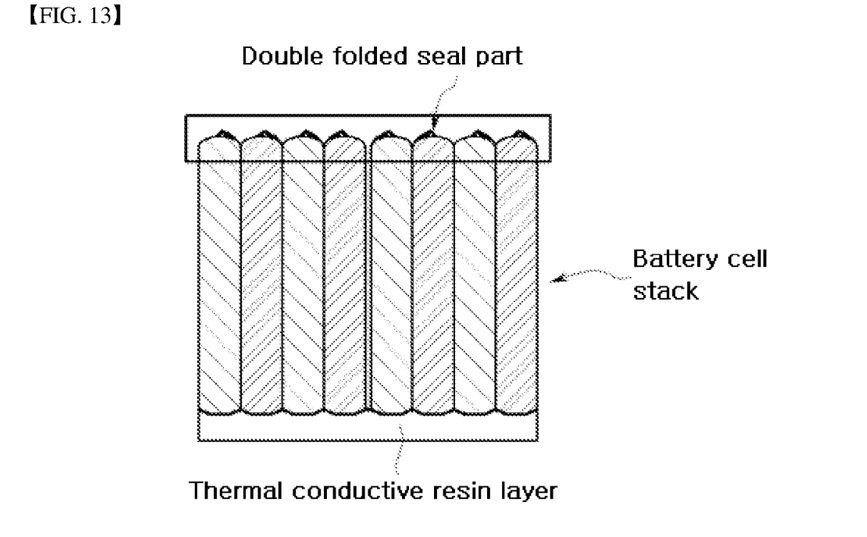
FIG. 13 is a cross-sectional view along line C-C of the yz plane of FIG. 12.

FIG. 12 is an illustration of a battery module according to a comparative example showing the ejection of gas and flame during flame generation. FIG. 13 is a cross-sectional view along a cross-section C-C of the yz plane of FIG. 12.

As illustrated in FIGS. 12 and 13, unlike the battery module according to the present embodiment, the end of the battery cell stack having a double-folded seal part is disposed on the opposite side of the lower surface of the housing on which the thermal conductive resin layer is formed. Because of such a structure, when a flame occurs in the battery module, gas and flame may be ejected through three junction parts corresponding to the weak part of the battery cell, wherein flames are ejected very strongly through the venting hole and the flame extinguishing mesh formed at the upper end of the battery module, and it may be difficult for the flame extinguishing mesh to function properly.

Figure 14:
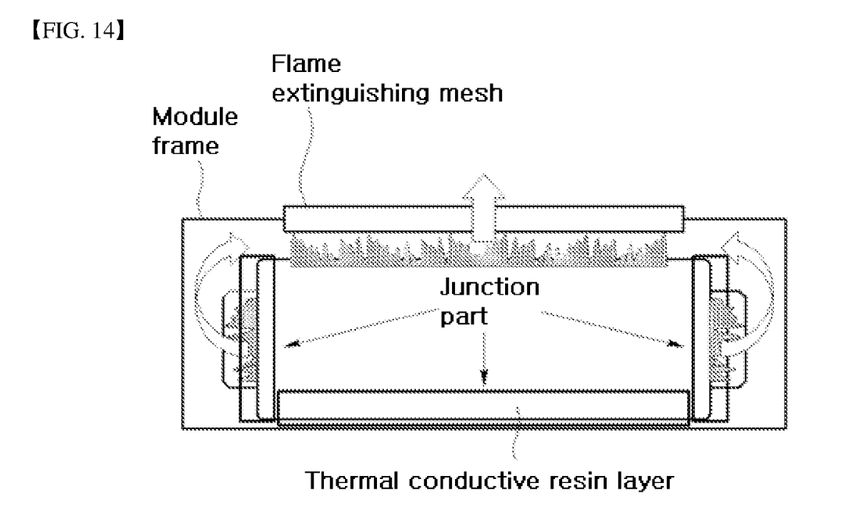
FIG. 14 is an illustration of a battery module according to an embodiment of the present disclosure showing the ejection of gas and flame at the time of flame generation.

FIG. 14 is an illustration of the battery module according to an embodiment of the present disclosure showing the ejection of gas and flame at the time of flame generation.

As illustrated in FIG. 14, the first end of the battery cell stack having a double-folded seal part in the battery module according to the present embodiment can be covered with a thermal conductive resin layer, whereby the flame through the first end of the battery cell stack is shut off while consolidating the cell stack, and flame ejection from the upper end of the battery module located on the opposite side of the first end of the battery cell stack can be minimized Therefore, it is possible to obtain the effect of maximizing the function of the flame extinguishing mesh by weakening the intensity of the flame emitted through the flame extinguishing mesh because the flame is mainly ejected only at the lead end of the battery module through the flame extinguishing mesh formed at the upper end of the battery module.

Meanwhile, one or more battery modules according to an embodiment of the present disclosure can be packaged in a pack case to form a battery pack. Although not shown in the figure, a cooling plate may be located under the lower surface of the housing, and the battery cell stack may be housed in the housing so that the double-folded seal part is disposed on the lower surface of the housing adjacent to the cooling plate.

The above-mentioned battery module and the battery pack including the same can be applied to various devices. Specifically, such a device can be applied to a vehicle means such as an electric bicycle, an electric vehicle, or a hybrid vehicle, but the present disclosure is not limited thereto, and is applicable to various devices that can use a battery pack, which also falls within the scope of the present disclosure.

Although the invention has been shown and described above with reference to the preferred embodiments, the scope of the present disclosure is not limited thereto, and numerous other modifications and improvements can be made by those skilled in the art by using the basic principles of the invention defined in the appended claims, which also falls within the spirit and scope of the present disclosure.

The invention claimed is:

1. A battery module comprising:
   a battery cell stack comprising a plurality of battery cells,
   a housing accommodating the battery cell stack, and
   a thermal conductive resin layer between a lower surface of the housing and a first end of the battery cell stack,
   wherein at least one of the battery cells comprises a double-folded seal part at a first end of the battery cell stack,
   wherein the thermal conductive resin layer has a recessed pattern on a surface of the thermal conductive resin layer facing the battery cell stack, the recessed pattern comprising at least one recessed part corresponding to the double-folded seal part of the at least one of the battery cells.

2. The battery module according to claim 1, further comprising:
   at least one injection hole on the lower surface of the housing and configured to inject a thermal conductive resin.

3. The battery module according to claim 2, wherein:
   the lower surface of the housing comprises a plurality of injection holes, and the plurality of injection holes are at a center of the lower surface of the housing and at both ends along a longitudinal direction of the housing.

4. The battery module according to claim 1, further comprising:
   a venting hole on an upper surface of the housing adjacent to a second end that is located opposite to the first end of the battery cell stack.

5. The battery module according to claim 4, further comprising:
   a flame extinguishing mesh covering the venting hole.

6. A method of manufacturing a battery module, the method comprising the steps of:
   stacking a plurality of battery cells to form a battery cell stack,
   placing the battery cell stack in a housing,
   inverting the housing such that a lower surface of the housing faces upward, and
   injecting a thermal conductive resin through at least one injection hole formed in the lower surface of the housing,
   wherein the thermal conductive resin covers a first end of the battery cell stack having a double-folded seal part
   wherein a thermal conductive resin layer, which is formed by injecting the thermal conductive resin, has a recessed pattern on a surface of the thermal conductive resin layer facing the battery cell stack, the recessed pattern comprising at least one recessed part corresponding to the double-folded seal part.

7. The method according to claim 6, further comprising:
   after injecting the thermal conductive resin, inverting the housing such that the lower surface of the housing faces downward.

8. The method according to claim 6, further comprising:
   before placing the battery cell stack in the housing, inverting the battery cell stack such that the first end of the battery cell stack is disposed on the lower surface of the housing.

9. The method according to claim 6, further comprising:
   forming a venting hole in an upper surface of the housing; and forming a flame extinguishing mesh covering the venting hole.

10. A battery pack comprising:
    the battery module according to claim 1, and
    a cooling plate located below the lower surface of the housing.

* * * * *